Sept. 15, 1942.    F. H. NICOLL    2,295,802
REFLECTIVE OPTICAL SYSTEM
Filed July 1, 1941
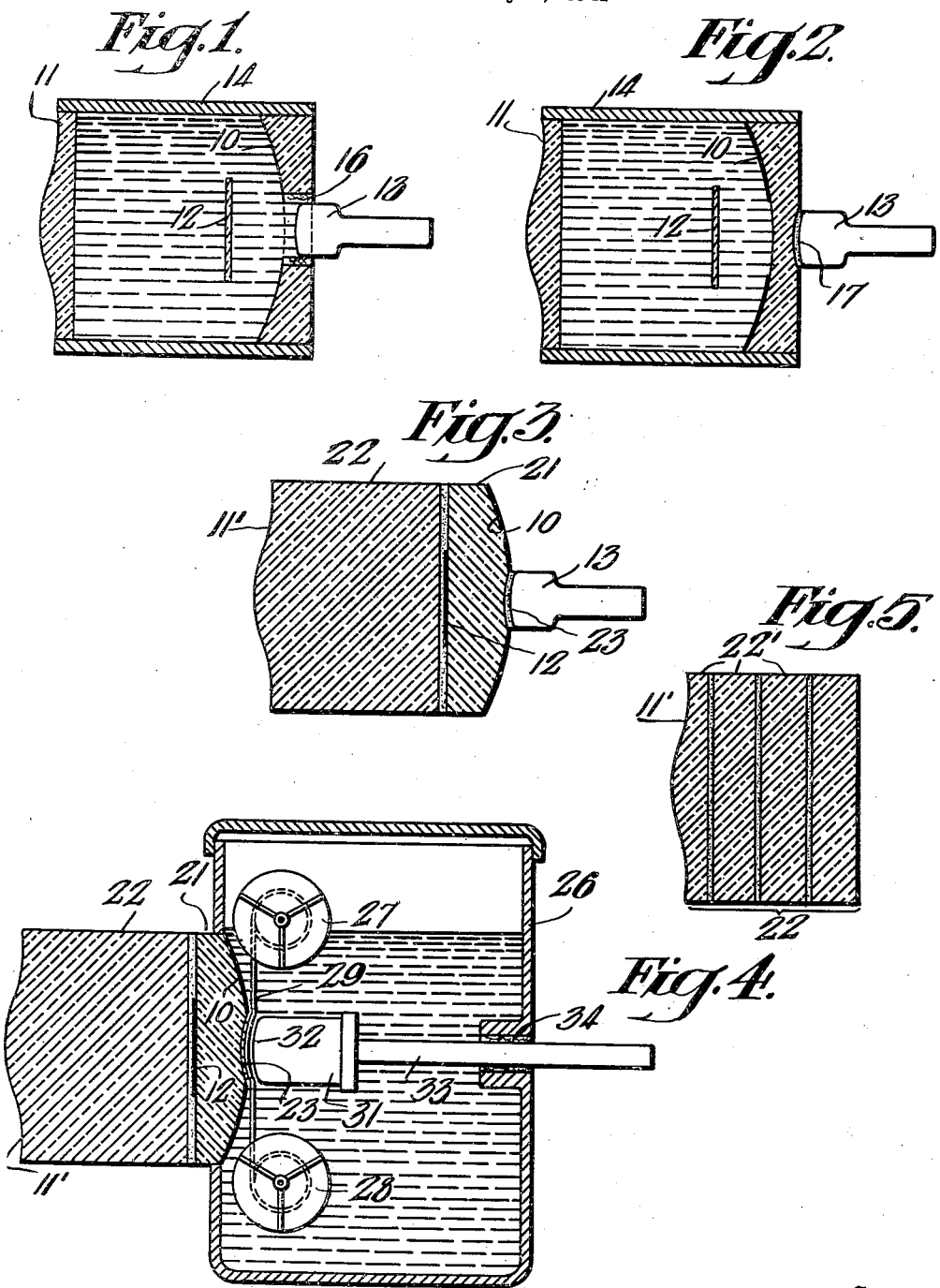
Inventor
Frederick H. Nicoll
By
Attorney Patented Sept. 15, 1942

2,295,802

UNITED STATES PATENT OFFICE 2,295,802

REFLECTIVE OPTICAL SYSTEM

Frederick H. Nicoll, Merchantville, N. J., assignor to Radio Corporation of America, a corporation of Delaware Application July 1, 1941, Serial No. 400,626

12 Claims. (Cl. 178—7.5)

My invention relates to optical systems of the type including a spherical mirror and a plate or lens for correcting spherical aberration and, in particular, it relates to improved designs for systems of the type including, in addition, a plane mirror.

An object of the invention is to provide a system of the above-described type which has improved light gathering power.

Another object of the invention is to provide a system of the above-described type in which the mirror surfaces remain clean and are not in danger of being scratched.

In application Serial No. 353,003, filed August 17, 1940, in the name of David W. Epstein, there is described an optical system comprising a spherical mirror, a spherical aberration correcting plate and a plane mirror which is especially suitable for the projection of television pictures. I have found that the light gathering power of this system may be increased by so assembling it that it may be filled with oil or other liquid having a high index of refraction, or preferably, by constructing it as a "solid" type system. Since the mirror surfaces in my improved designs are enclosed, they cannot collect dust and are protected from physical damage.

The invention will be better understood from the following description taken in connection with the accompanying drawing in which Figure 1 is a view of an oil filled optical system embodying my invention as applied to a television projector, Figure 2 is a view of another embodiment of the invention wherein the optical system is oil filled, Figure 3 is a view of the invention embodying the "solid" type optical design, Figure 4 is a view of the invention as applied to a camera, and Figure 5 shows a modification of the "solid" type design.

In the several figures, like parts are indicated by the same reference numerals.

Referring to Fig. 1, there is shown an optical system comprising a spherical mirror 10, a spherical aberration correction plate 11, and a plane mirror 12. A cathode ray projection tube is shown at 13 located opposite or in an opening in the mirror 10.

The optical system 10—11—12 is mounted in an oil tight cylinder or casing 14 and the space between the tube 13 and the mirror 10 is made oil tight by means of a suitable seal 16.

The casing 14 is filled with a liquid, such as a suitable oil, having a high index of refraction whereby the light gathering power is increased in the ratio of $N_1/N_0$ where $N_1$ is the index of refraction of the liquid and $N_0$ is the index of refraction of air.

It will be seen that the mirror surfaces 10 and 12 are immersed in the oil and are enclosed by the casing 14 whereby they will remain dust free and are not in danger of being scratched or otherwise damaged.

Figure 2 shows an embodiment of the invention which makes unnecessary the use of the oil seal 16. Here the mirror 10 has no opening therethrough but, instead has its central external surface indicated at 17 ground to the same curvature as the end of the cathode ray tube 13. Optical contact is made between the surface 17 and the end of the tube as by cementing the two surfaces together with Canada balsam.

The space between the mirror 10 and the correcting plate 11 is filled with an oil or other liquid having preferably the same index of refraction as the glass of the mirror 10.

It will be noted that in both of the above-described designs, the cathode ray tube is outside the optical system whereby the oil will remain clean since there are no deflecting coils or the like in the oil to contaminate it.

A preferred embodiment of the invention is shown in Fig. 3 where a system of the "solid" type is shown. It comprises two solid pieces of glass or suitable plastic indicated at 21 and 22.

The element 21 has a surface 10 shaped and aluminized or otherwise coated to form the spherical mirror. The opposite surface of element 21 is flat, the central portion being optically flat. On this central portion of the flat surface there is formed a plane mirror 12 by aluminizing this area or otherwise making it reflecting.

The element 22 forms the spherical aberration correcting plate corresponding to the plate 11 in Figs. 1 and 2, the surface 11' being shaped or figured to give the proper curvature for spherical aberration correction where the opposite surface is flat.

The two flat surfaces of elements 21 and 22 are placed in optical contact as by cementing them together with Canada balsam.

As in Figure 2, the end of the cathode ray tube 13 is caused to make optical contact with the system at 23 by giving the central portion of the element 21 a curvature which is the same as the end of the tube and then, for example, cementing the end of tube 13 to the surface 23.

As is well known in the art, the "solid" type of system has great light gathering power. Also, it will be apparent that in Fig. 3, the reflecting surfaces 10 and 12 are not exposed to the air and are mechanically protected from scratches and the like. Also, they are protected from oxidization which ordinarily reduces the reflecting ability of an aluminum mirror shortly after the mirror surface has been formed.

In each of the above-described systems, optical halation in the fluorescent material on the end of the cathode ray tube 13 is eliminated by optical contact between the system and the tube.

My invention, while it has been described with particular reference to the projection of a television picture, may have other uses. For example, as shown in Fig. 4, the system may be employed in a camera having a light proof and oil tight casing 26, supply and take-up spools 27 and 28, respectively, for a strip of film 29, and a plunger 31 for pressing the film into optical contact with the lens system.

In order to obtain this desired optical contact, the casing 26 is filled with oil and the end 32 of the plunger 31 is given the same curvature as the end of the tube 13 in the other figures. Any suitable means such as a plunger arm 33 passing through an oil seal 34 in the casing 26 may be employed for pressing a film frame into the convex portion 23 when a photograph is to be taken.

The optical system 22—21 may be provided with a lens cap (not shown) which in many instances may be utilized as the camera shutter by removing it to expose the film and then replacing it.

It will be understood that in all figures, as explained in the above-identified Epstein application, the optical center of the aberration correcting plate should be at substantially the center of curvature of the spherical mirror while the plane mirror should be so positioned that a light ray reflected from it appears to come from a source located at least approximately at the focus of the spherical mirror.

As shown in Fig. 5, the "solid" type design of Fig. 3 may consist of more than two pieces of solid material. For example, the block 22, especially if glass, may consist of a plurality of plates 22' cemented in optical contact by Canada balsam. A similar construction may be employed for the block 21.

It is to be understood that in the claims the phrase "a block of solid transparent material" or a similar phrase is intended to include either of the types of construction shown in Figs. 3 and 5.

I claim as my invention:

1. An optical system comprising a light reflecting surface of revolution mirror having an opening or window in the center thereof, a plane mirror having its reflecting surface facing said surface of revolution and located between said surface of revolution and its nearest conjugate focus, a correcting plate located in the region of the center of curvature of said surface of revolution and shaped or figured to correct for spherical aberration, and a transparent material having a higher index of refraction than air filling the space between said surface of revolution and said correcting plate.

2. In combination, an optical system comprising a spherical mirror having an opening or window in the center thereof, a plane mirror having its reflecting surface facing said spherical mirror and located between said spherical mirror and its nearest conjugate focus, a correcting plate located in the region of the center of curvature of said spherical mirror and shaped or figured to correct for spherical aberration, a transparent material having a higher index of refraction than air filling the space between said spherical mirror and said correcting plate, and a cathode ray tube having a screen structure positioned opposite the reflecting surface of said plane mirror and so located that effectively it is substantially at the said nearest conjugate focus of the spherical mirror.

3. An optical system comprising a spherical mirror having an opening or window in the center thereof, a plane mirror having its reflecting surface facing said spherical mirror and located between said spherical mirror and its nearest conjugate focus, and a correcting plate located in the region of the center of curvature of said spherical mirror and shaped or figured to correct for spherical aberration, a liquid tight casing enclosing the space between said spherical mirror and said correcting plate, and a transparent liquid filling said space.

4. In combination, an optical system comprising a spherical mirror having an opening or window in the center thereof, a plane mirror having its reflecting surface facing said spherical mirror and located between said spherical mirror and its nearest conjugate focus, a correcting plate located in the region of the center of curvature of said spherical mirror and shaped or figured to correct for spherical aberration, a liquid tight casing enclosing the space between the spherical mirror and the correcting plate, and a transparent liquid filling said space, and a cathode ray tube having a screen structure positioned opposite the reflecting surface of said plane mirror and so located that effectively it is substantially at the said nearest conjugate focus of the spherical mirror.

5. In combination, an optical system comprising a spherical mirror having a window in the center thereof, said spherical mirror being supported by a solid transparent material, a plane mirror having its reflecting surface facing said spherical mirror and located between said spherical mirror and its nearest conjugate focus, a correcting plate located in the region of the center of curvature of said spherical mirror and shaped or figured to correct for spherical aberration, a liquid tight casing enclosing the space between the spherical mirror and the correcting plate, a transparent liquid filling said space, and a cathode ray tube having a screen structure on the end of the tube and positioned opposite the reflecting surface of said plane mirror and so located that effectively it is substantially at the said nearest conjugate focus of the spherical mirror, the end of said tube being in optical contact with said solid transparent material.

6. A reflective optical system of the solid type comprising a block of solid transparent material having a reflecting concave spherical surface with a window in the center thereof and having a surface opposite thereto which has a flat central portion, a reflecting surface on the central portion only of said flat surface to form a plane mirror, each of said reflecting surfaces being reflecting toward the inside of said block, and a second block of solid transparent material having a surface facing said plane mirror and having a surface opposite thereto which is shaped or figured to correct for the spherical aberration of the spherical mirror, the facing surfaces of said blocks being in optical contact and the axial lengths of said blocks being such that said aberration correction surface on the optical axis is at least approximately at the center of curvature of said spherical mirror.

7. A reflective optical system of the solid type comprising a block of solid transparent material having a reflecting concave spherical surface having a window therein and having a surface opposite thereto which has a flat central portion, a reflecting surface on the central portion only of said flat surface to form a plane mirror, each of said reflecting surfaces being reflecting toward the inside of said block, and a second block of solid transparent material having a surface facing said plane mirror and having a surface opposite thereto which is shaped or figured to correct for the spherical aberration of the spherical mirror, the facing surfaces of said blocks being in optical contact and the axial lengths of said blocks being such that said aberration correction surface at the optical axis is at least approximately at the center of curvature of said spherical mirror and also such that the plane mirror reflecting surface is so positioned that the light rays reflected therefrom appear to originate at least approximately at the focus of the spherical mirror.

8. A reflective optical system of the solid type comprising a block of solid transparent material having a reflecting concave spherical surface with a window in the center thereof and having a surface opposite thereto which has a flat central portion, a reflecting surface on the central portion only of said flat surface to form a plane mirror, each of said reflecting surfaces being reflecting toward the inside of said block, and a second block of solid transparent material having a surface facing said plane mirror and having a surface opposite thereto which is shaped or figured to correct for the spherical aberration of the spherical mirror, the facing surfaces of said blocks being in optical contact and the axial lengths of said blocks being such that said aberration correction surface on the optical axis is at least approximately at the center of curvature of said spherical mirror, and a cathode ray tube having a screen structure positioned opposite the reflecting surface of said plane mirror and having the screen end thereof in optical contact with said first block.

9. A reflective optical system of the solid type comprising a block of solid transparent material having a reflecting concave spherical surface with a window therein and having a surface opposite thereto which is flat, a reflecting surface on the central portion only of said flat surface, each of said reflecting surfaces being reflecting toward the inside of said block, and a second block of solid transparent material having a flat surface and having a surface opposite thereto which is shaped or figured to correct for the spherical aberration of the spherical mirror, said flat surfaces being in optical contact and the axial lengths of said blocks being such that said aberration correction surface at the optical axis is at least approximately at the center of curvature of said spherical mirror.

10. An optical system for image projection and enlarging comprising a light source adapted to emit light for producing a bi-dimensional optical picture image of finite area substantially centered on the optical axis of the system, a plane mirror positioned to reflect light from said source, a light reflecting surface of revolution having its concave reflecting surface positioned facing said plane mirror to receive reflected light therefrom, an aspherical zone plate positioned to receive the light reflected from said concave surface, said zone plate being arranged external to the light path from the light source to the concave reflecting surface and axially aligned with each and adapted to correct the spherical aberrations introduced into the reflected light rays by the concave reflecting surface whereby a sharply focused enlargement of the original finite dimension light source is developed at a plane located at a finite distance from the aspherical zone plate, and a transparent material having a higher index of refraction than air filling the space between said concave reflecting surface and said zone plate.

11. An image projection device for a light source of finite bi-dimensional image area, said device comprising an axially aligned optical system including a plane mirror reflecting surface positioned to reflect light from said source, a concave reflecting surface of revolution positioned to receive the light reflected from said plane surface, and an aspherical zone plate positioned external to the path of the light travelling from the light source to the concave reflector and positioned to receive the reflected light from the concave reflector, said zone plate being adapted to correct for spherical aberrations introduced by the concave reflecting surface whereby the optical system projects a sharply defined enlarged image substantially free from spherical aberration upon a viewing surface located at a finite distance from the zone plate, said two reflecting surfaces being on opposite sides of a block of solid transparent material and in intimate contact therewith.

12. The invention according to claim 11 wherein there is also a transparent material having a higher index of refraction than air filling the space between said block of solid material and said zone plate.

FREDERICK H. NICOLL.